SAMUEL LESSIG, Sr.
Improvement in Grain Separators.

No. 120,983.                    Patented Nov. 14, 1871.

Witnesses.                      Inventor.

No. 120,983

UNITED STATES PATENT OFFICE.

SAMUEL LESSIG, SR., OF READING, PENNSYLVANIA.

IMPROVEMENT IN GRAIN-SEPARATORS.

Specification forming part of Letters Patent No. 120,983, dated November 14, 1871.

*To all whom it may concern:*

Be it known that I, SAMUEL LESSIG, Sr., ot Reading, in the county of Berks and State of Pennsylvania, have invented a new and Improved Apparatus for Separating Grain from Straw and Chaff; and I do hereby declare that the following is a full and exact description thereof, reference being had to the accompanying drawing which forms a part of this specification—

Figure 1:
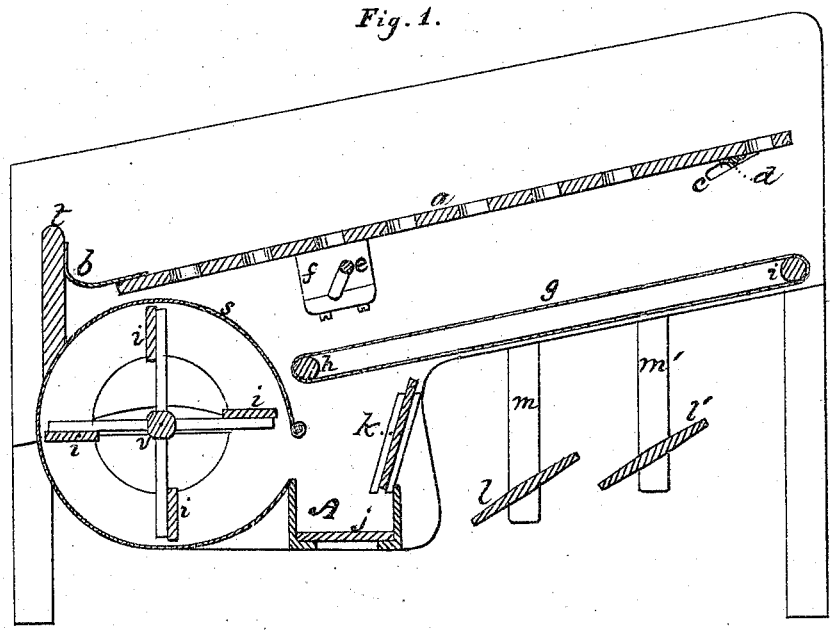
Figure 2:
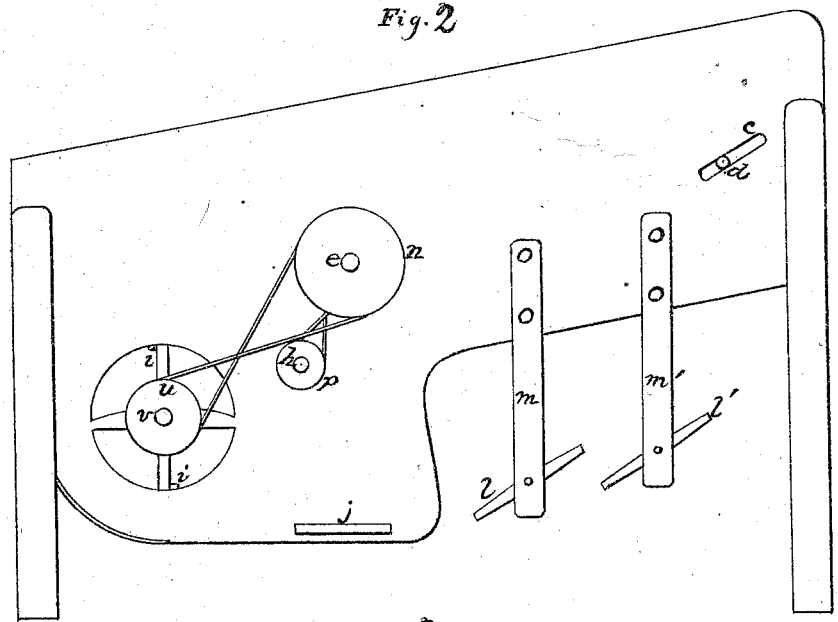
Figure 3:
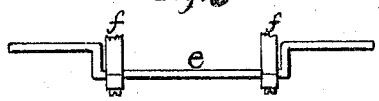

Figure 1 being a longitudinal vertical section of said apparatus; Fig. 2, a side elevation of the same; and Fig. 3, a view of a detached portion of said apparatus.

Similar letters indicate corresponding parts in the drawing.

The supporting-body of my improved apparatus for separating grain from straw and chaff is clearly shown by the drawing, and may be constructed in any well known or proper manner.

The intermixed straw, chaff, and grain are received from the thrashing-machine upon the shaking straw-separator $a$ of the apparatus, which is suspended in an inclined position between the sides of the body of the apparatus, and is operated by the means shown in the drawing. The lowest end of the shaking straw-separator is connected to the front end $t$ of the body of the apparatus by means of some close and flexible material, $b$, which must be of sufficient length to allow the requisite degree of shaking motion to be imparted to that end of the separator. The opposite and most elevated end of the shaking straw-separator $a$ rests upon pins $d$, which project from the sides thereof into inclined slots in the opposite sides of the body of the apparatus, as shown in the drawing. The shaking straw-separator $a$ may be either a slatted or a perforated open frame, and may be made of any suitable materials. A sufficient amount of shaking and longitudinally-reciprocating motion must be imparted to the straw-separator $a$ to remove the grain from the straw and to carry off and discharge the straw from the separator. This is done by the rotation of the double crank-shaft $e$, whose central or crank portion is embraced by ears $f\,f$, Fig. 3, which descend from the separator, and whose journals work in suitable bearings which are received into apertures in opposite sides of the body of the apparatus. Beneath the shaking straw-separator $a$ an endless carrier, $g$, supported by the rollers $h\,i$, receives the grain and chaff, which fall through the openings in said separator and discharges the same immediately in front of the eduction-outlet of the drum $s$ of the fanner $i$ within the same, where the said grain and chaff are met by the blast of air from the fanner, which carries the chaff and lighter kernels of grain upward and outward through the aperture between the under side of the carrier $g$ and the upper edge of the adjustable blast-regulator $k$, while the heavier kernels of grain fall onto the removable bottom $j$ of the receptacle A, which may be opened to communicate with any larger receptacle, or to communicate directly with the finishing winnowing-machine. The lighter kernels of grain, which may be driven off with the chaff beyond the blast-regulator $k$, will be arrested and separated from the chaff by means of the pivoted separator $l$, which is located between and supported by the pendants $m\,m$ that descend from and are connected with the sides of the body of the apparatus, as shown in the drawing. This pivoted separator may be adjusted to such an angle of inclination as may be found best for arresting the flying kernels of grain; and for the purpose of insuring the separation of all the kernels of grain from the flying chaff, one or more additional pivoted separators, $l'$, may be located between and supported by additional pendants, $m'\,m'$, as shown in the drawing. The pulley $u$ on the fanner-shaft $v$ is connected by means of a crossed band with the pulley $n$ on the crank-shaft $e$, and the pulley $n$ on the crank-shaft $e$ is connected by means of a crossed band with the pulley $p$ on the carrying carrier-roller $h$ of the endless carrier $g$.

Power may be imparted from any first mover either to the fanner-shaft $v$ or to the crank-shaft $e$.

The endless carrier $g$ may be made of any flexible fabric, or may be composed of a series of connected slats.

I claim as my invention—

The combination and arrangement of the blast-regulator $k$ and the pivoted separator $l$ with each other and with the fanner of an apparatus for separating grain from straw and chaff, substantially as herein set forth.

In testimony that the aforegoing is a full and exact description of my improved apparatus for separating grain from straw and chaff, I hereunto subscribe my name.

SAMUEL LESSIG, SR.

Witnesses:
   LEVI J. SMITH,
   MATTHIAS MENGEL.

(159)